United States Patent

[11] 3,610,525

| [72] | Inventors | David James Townsend<br>106 Moorcraft Road, Birmingham;<br>Claude Mortimer Townsend, Eastcote Manor, Hampton-In-Arden, Warwickshire, both of England |
|---|---|---|
| [21] | Appl. No. | 713,779 |
| [22] | Filed | Mar. 18, 1968 |
| [45] | Patented | Oct. 5, 1971 |

[54] VEHICLE ALIGNER
2 Claims, 6 Drawing Figs.

[52] U.S. Cl. .................................................. 238/10 R,
104/1, 104/35, 104/46, 238/1, 246/465
[51] Int. Cl. .................................................. E01b 7/28
[50] Field of Search ......................................... 104/29, 30, 36–46, 88, 105, 249, 250, , 35, 43–47, 105, 1; 238/10–13, 1, 2, 10 R; 246/454–465

[56] References Cited
UNITED STATES PATENTS

| 689,363 | 12/1901 | McDonner | 238/13 |
| 1,654,869 | 1/1928 | Eichelgrun | 238/12 |
| 1,903,092 | 3/1933 | Gory et al. | 104/29 |
| 2,788,179 | 4/1957 | Hafer et al. | 238/1 |
| 3,276,393 | 10/1966 | Lewis | 238/12 |
| 904,335 | 11/1908 | Lawry | 104/47 |
| 2,943,579 | 7/1960 | Geddes | 104/130 |
| 1,344,866 | 6/1920 | Coulter | 246/375 |
| 3,191,782 | 6/1965 | Pernum | 104/44 |

*Primary Examiner*—Arthur L. La Point
*Assistant Examiner*—Richard A. Bertsch
*Attorney*—Holman & Stern

ABSTRACT: A track layout comprising track sections, each having zones at least one of which defines a recess for location of a wheel of a vehicle for which the tracking is intended, and at least one stop is disposed adjacent to an edge of each of the sections for limiting the movement of the vehicle along the track.

VEHICLE ALIGNER

This invention relates to means for aligning wheeled vehicles.

If vehicles, such as load-bearing wheeled pallets, are closely disposed in a given area, access to any one of them can be readily obtained if they are aligned in two mutually transverse directions. Similarly if vehicles which are aligned in one direction are to be moved individually in a direction transverse to the direction of alignment, the location of the vehicles with respect to one another is important. This has particular significance when the vehicles are mounted upon tracking, sections of which extend in mutually transverse directions.

It is an object of the present invention to provide a simple and convenient means for alignment of vehicles such as load-bearing pallets.

A further object of the invention is to provide tracking on which vehicles can run and in which the accurate location of a vehicle can be readily achieved.

According to a further aspect of the present invention a track section for wheeled vehicles includes at least one zone defining a recess in which a wheel can be located.

Figure 1:
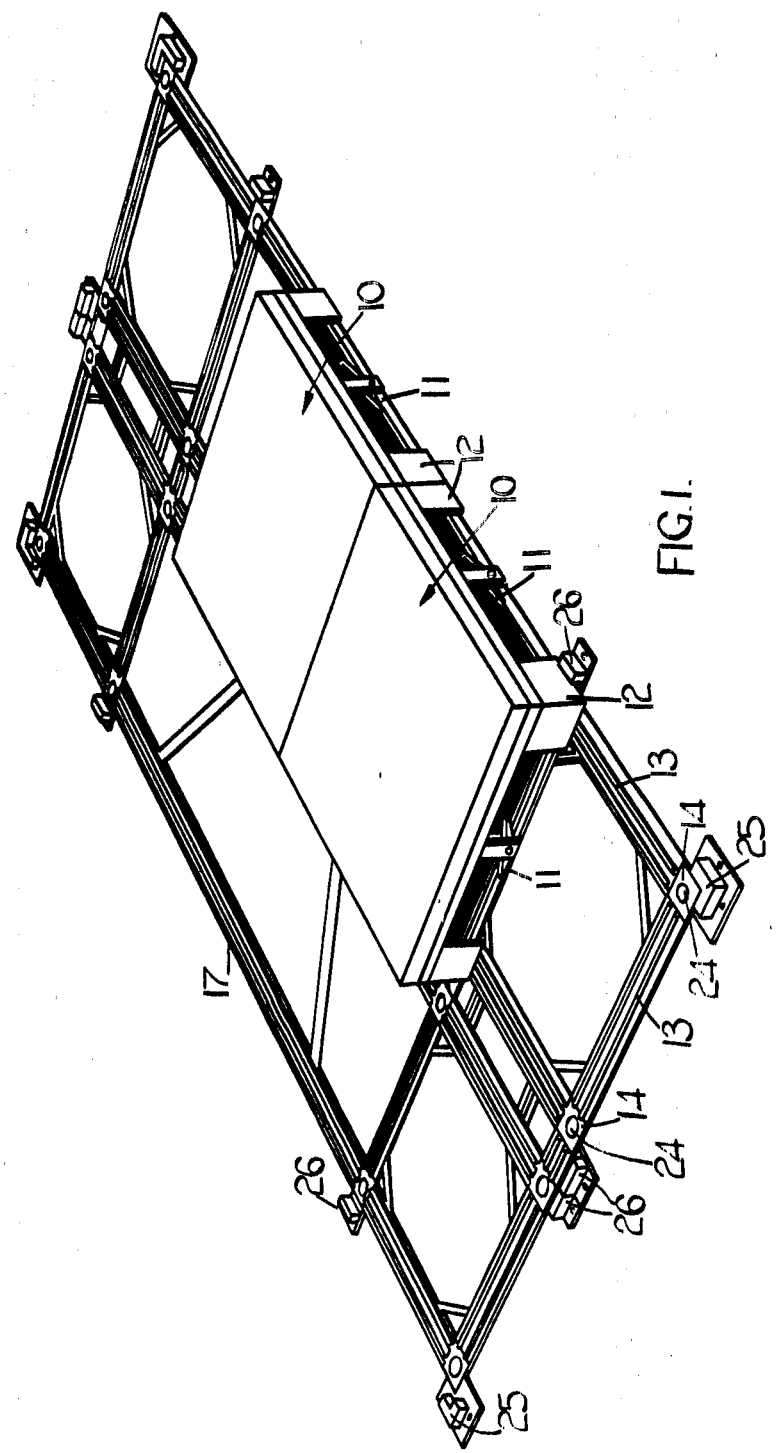
Figure 2:
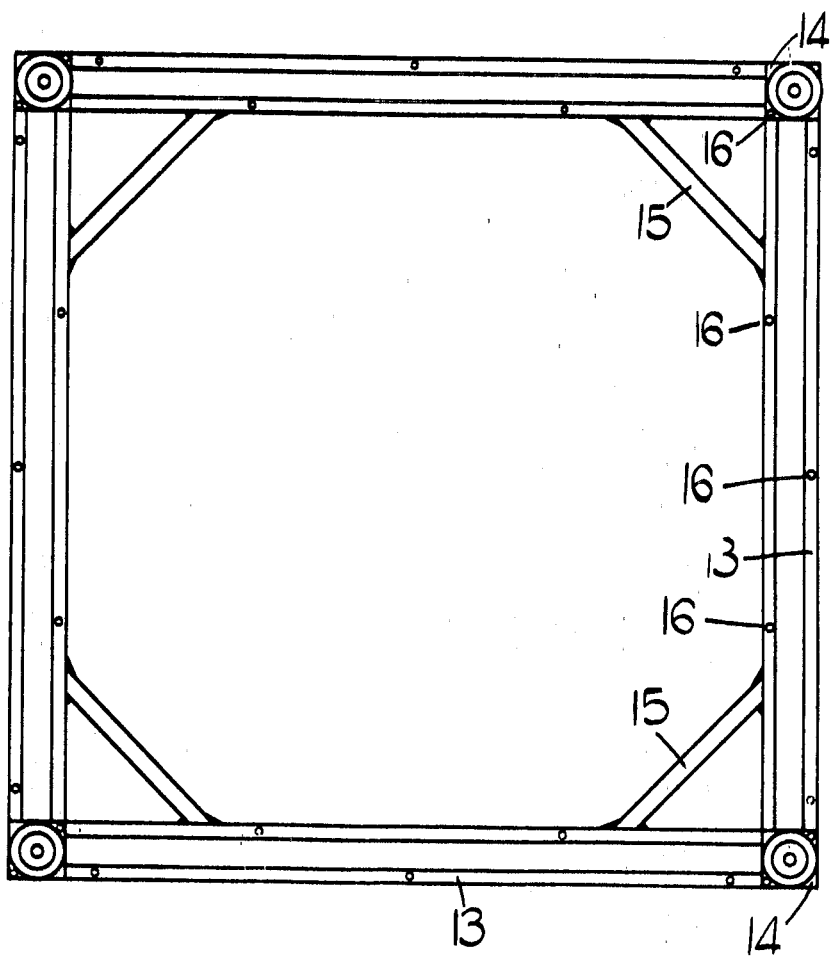
Figure 3:
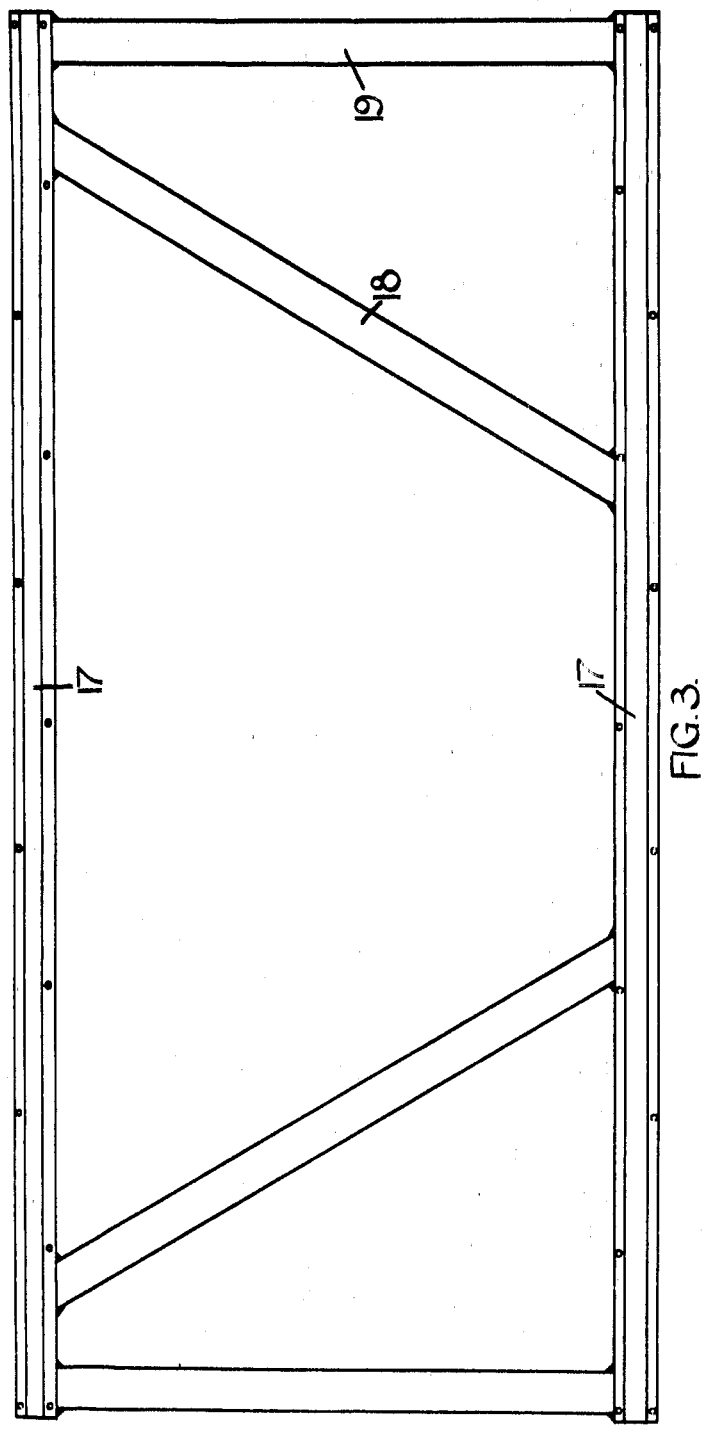
Figure 4:
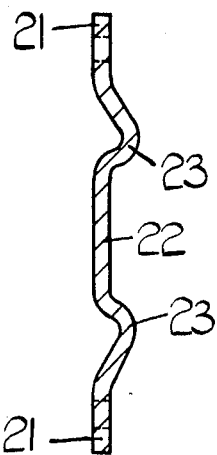
Figure 5:
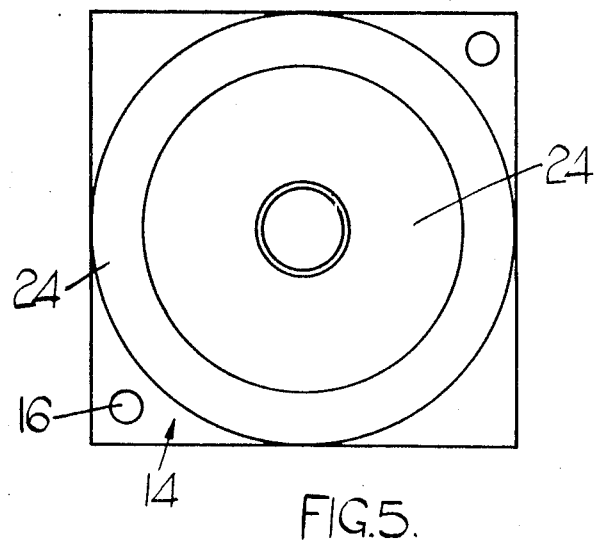
Figure 6:

The invention will now be described by way of example with reference to the accompanying drawings in which:

FIG. 1 is a perspective view of tracking and vehicles, the tracking being constructed in accordance with the invention, FIG. 2 is a plan view of a composite track section, FIG. 3 is a plan view of a alternative form of composite section, FIG. 4 is a cross-sectional view of tracking used in the FIGS. 1, 2 and 3 constructions, and FIGS. 5 and 6 are plan and cross-sectional side elevation views respectively of a track plate.

In FIG. 1 there is illustrated a layout of tracking for wheeled vehicles 10. As shown these vehicles are load-bearing pallets. Each of the pallets is square in plan, but may be rectangular, and has four wheels (which are not visible in the drawings), the orientation of all of which can be changed simultaneously by operation of any one of four pedals 11, through linkage (not shown) on the pallet. The wheels are near the respective corners of the pallet and are protected by skirts 12 on the pallet corners.

The tracking layout can take any convenient form but that shown has two parallel double tracks extending in one direction and two further parallel double tracks extending at right angles to them. Pallets 10, having wheel spacings equal to the track spacings, can thus follow a closed loop if the wheel directions of each are changed when they reach the corners of the layout.

The tracking layout is made up from two forms of composite track section shown in FIGS. 2 and 3 respectively. The section of FIG. 2 is formed from four equal track lengths 13 connected at the corners by plates 14 welded to the track ends and there are additional corner braces 15. The distance between the centers of adjacent corner plates 14 is equal to the spacings of adjacent pallet wheels. The whole section is jig welded so that any two such sections are exactly alike. The track lengths 13, as well as the plates 14, have spaced holes 16 for reception of screws whereby the section can be secured to a floor or other surface. The FIG. 3 section has two long lengths 17 of track spaced apart by braces 18 and members 19. This section is also welded in a jig and has holes 16 for bolts.

The cross-sectional shape of the track lengths 13 and 17, as shown in FIG. 4, includes a pair of flat external flanges 21 and a central flat region 22. Separating the flanges 21 from the central region 22 are two ridges 23, the inwardly presented surfaces of which are steeply inclined to the plane of the central portion 22. The outsides of the ridges are shallowly inclined to the flange planes. The wheels of the pallets 10 engage in the track between the ridges 23 and their side faces are chamfered at angles equivalent to those of the inwardly presented surfaces of the ridges 23. Angular displacement of the wheels through an angle less than 90°, to engage both ridges 23 simultaneously therefore serves to lock the wheels to prevent movement of the pallet along the tracking. One of the plates 14 is shown enlarged in FIGS. 5 and 6 and defines a central shallow circular dished recess 24. Surrounding this is a shallow ramp 24.

At each corner of the tracking layout there are L-shaped stops 25 positioned to engage the skirts 12 of the pallets 10 to arrest them. These are also welded in place on the adjacent sections. Further stops 26 are positioned adjacent to each plate 14 at the outside of the layout. The stops 25 and 26 are so positioned that they engage a pallet when its wheels have passed out of the track length ends, and are disposed just beyond the centers of the recesses of the plates 14 respectively. The travel of the wheels beyond the plate centers before reaching the stops 25 or 26 is, for example, only ⅛ inches. When permitted to do so, the pallet engaging the stops 25 or 26 at the end of a track will roll back until the wheels are located in the centers of the recesses 24 respectively.

Should it now be desired to change the direction of movement of any pallet so located, the wheel vertical pivot axes will be automatically aligned with the track lengths extending at right angles.

If all track sections are like that of FIG. 2, and all pallets 10 have the same wheel spacing as the spacing of the zones defined by the plates 14, any one pallet can be moved in either of two directions since all pallets will be aligned in the two directions.

The track lengths 17 may, if required, include depressions intermediate their lengths for location of pallets in desired positions between the ends of the lengths.

Since the wheels are not visible to an operator, the track sections may include indicator plates which become aligned with a pallet pedal 11 when that pallet is located in a particular position, by virtue of the recesses in the plates 14 or in the track lengths 17, as the case may be.

It will be apparent that the invention provides an extremely convenient way of locating vehicles either for storage in aligned rows or for alignment with intersecting tracks. In addition, automatic location is provided on sloping surfaces. Whilst the zones of the invention are particularly useful in conjunction with pallets shown, they may also be used to locate vehicles provided with other forms of wheels, such as casters. The tracking may be modified by provision of some plates 14 with recesses and some flat plates. In any set of four which can be engaged by a pallet, there must be at least one with a recess.

The tracking may be formed from any suitable material such as ferrous or nonferrous metals or plastics material.

The plates 14 may be hardened to withstand wear during wheel changes in direction.

In another form of the invention there is provided a bearing surface such as a floor in which, at spaced positions, there are recesses formed by depressions or formed in plates similar to the plates 14, the spacing of the recesses being equal to the spacing of vehicle wheels for which the bearing surface is intended. There must be at least one recess included in any set of zones at which a vehicle can be located.

This tracking layout, formed from jig welded sections enables any desired configuration to be layed down accurately and quickly. If any section is worn or damaged a replacement section can be fitted which, since it is also jig welded, will fit exactly in place.

We claim:

1. A track section for wheeled vehicles comprising a pair of parallel tracks, at least one zone on one of the tracks defining a recess for engaging and locating a vehicle wheel, stops associated with the edges of the section for limiting movement of a vehicle along the track, the positions of the stops being such that the vehicles will, when engaged with the stops be beyond a position of engagement of a vehicle wheel in a zone, and the recess or recesses at the zone or zones being shaped to move a vehicle into full engagement with said recess or recesses when the vehicle is permitted to move thereinto.

2. A track section for wheeled vehicles comprising a pair of parallel tracks, at least one zone on one of the tracks defining a recess for engaging and locating a vehicle wheel, at least one stop being disposed adjacent to an edge of the section for limiting movement of a vehicle along the tracks, the stop being so positioned that when a vehicle wheel is engaged therewith, the vehicle will be beyond a position of engagement of the vehicle wheel in a recess, and the recess being shaped to move the vehicle wheel from engagement with the stop into full engagement with said recess.